United States Patent [19]

Harper

[11] 4,372,273
[45] Feb. 8, 1983

[54] QUADRATURE TRIGGER SYSTEM FOR SEQUENTIAL FUEL INJECTION

[75] Inventor: Peter W. Harper, Agne, France

[73] Assignee: The Bendix Corporation, Southfield, Mich.

[21] Appl. No.: 249,772

[22] Filed: Apr. 1, 1981

[51] Int. Cl.³ .............................................. F02D 5/02
[52] U.S. Cl. .................................... 123/490; 123/476; 123/492
[58] Field of Search ............... 123/490, 473, 476, 477, 123/643, 492, 414

[56] References Cited

U.S. PATENT DOCUMENTS

| | | | |
|---|---|---|---|
| 3,575,146 | 4/1971 | Creighton et al. | 123/485 |
| 3,612,009 | 10/1971 | Kamazuka et al. | 123/490 |
| 3,702,601 | 11/1972 | Gordon et al. | 123/490 |
| 3,710,763 | 1/1973 | Bassot et al. | 123/490 |
| 3,738,339 | 6/1973 | Huntzinger et al. | 123/415 |
| 3,759,231 | 9/1973 | Endo | 123/492 |
| 3,881,453 | 5/1975 | Harper et al. | 123/476 |
| 4,009,699 | 3/1977 | Hetzler et al. | 123/416 |
| 4,150,653 | 4/1979 | Grancoin | 123/617 |
| 4,176,627 | 12/1979 | Bassi | 123/490 |

Primary Examiner—Charles J. Myhre
Assistant Examiner—Andrew M. Dolinar
Attorney, Agent, or Firm—Russel C. Wells

[57] ABSTRACT

A quadrature trigger system for a sequential fuel injection system utilizes a single lobe timing cam connected to the camshaft of a four cylinder internal combustion engine as illustrated in FIG. 2. Positioned in a sensing relationship to the cam are two proximity sensors which generate bilevel electrical signals having a fifty percent duty cycle and which are spaced ninety electrical degrees apart. These electrical signals are decoded in a logic network to direct fuel injection pulses from either of two pulse generators to the proper sequenced fuel injector.

2 Claims, 3 Drawing Figures

QUADRATURE TRIGGER SYSTEM FOR SEQUENTIAL FUEL INJECTION

FIELD OF INVENTION

This invention relates in general to electronic fuel injection systems for internal combustion engines and in particular to a sensor and digital control means for generating sequential timing signals.

BACKGROUND OF INVENTION

U.S. Pat. No. 3,575,146 issued to Creighton et al teaches a three switch (sensor), one cam system for determining the ignition or injection times in internal combustion engines. This system is duplicated for each cylinder in the engine.

U.S. Pat. No. 3,738,339 issued to Huntzinger et al teaches a two sensor, two cam system for determining the ignition time for each cylinder. One sensor determines a predetermined number of degrees before the top-dead center position of each cylinder and the other sensor responds to a multi-toothed cam to determine each degree of rotation of the engine crankshaft. There is required to be used in conjunction with this patent, a distributor as shown in reference U.S. Pat. No. 3,605,713, cited in Col. 2 of U.S. Pat. No. 3,738,339, to direct the ignition pulse to the correct spark plug.

U.S. Pat. No. 4,009,699 issued to Hetzler et al, in which Huntzinger is a co-inventor, shows the same two sensor, two cam arrangement for determining the ignition timing of each cylinder.

In each of the above, there was in addition to a rotating timing member, a unique switching path to direct the end results of the timing member to a particular spark plug or injector. The rotating timing member, with its two or more switch elements, never generates a unique signal for a particular spark plug or injector but relies upon another element to select the particular spark plug or injector.

U.S. Pat. No. 3,710,763 issued to Bassot et al, discloses a switch for each injector plus a synchronizing switch for synchronizing the time of operation of each of the high speed injectors to a corresponding predetermined angular position of the engine camshaft.

U.S. Pat. No. 3,702,601 issued to Gordon et al, discloses the use of four switches to generate eight pulses each engine cycle and one switch to indicate each half of the engine cycle. Thus, five switches are required to generate the eight actuation pulses.

In my U.S. Pat. No. 3,881,453, I have disclosed an electronic fuel injection triggering means utilizing a four magnets which by their angular position on a rotor with respect to the angular position of four magnetic switches will generate a binary code at eight predetermined rotor positions. The binary code will then be decoded to generate a signal identifying each injector of the eight injectors. This system has the advantage over the other prior art systems of generating a known signal within ninety degrees of revolution of the camshaft instead of a full revolution but at the cost of four switches and magnets.

The classical technique, as is illustrated in the prior art, for triggering an ignition system is also used in triggering or controlling a sequential fuel injection system. This technique utilizes two sensors such as magnetic reed switches to provide two separate signals to a counting circuit. In the case of a four cylinder engine, one switch provides a synchronization signal for initializing the counter which signal occurs once per engine cycle and is typically indicative of the number one cylinder. The other switch generates clocking signals to count a divide-by-four counter for generating four actuation pulses per engine cycle to initiate the proper injection pulses. The synchronizing signal assures that the counter states are synchronized with the correct cylinder during the engine cycle. Thus, with two sensors, sychronization does not happen until the synchronizing pulse is generated which may be one complete engine cycle after engine turn-on.

The present invention solves the problem of electrically identifying the cylinder to be injected within ninety degrees of an engine cycle by using two switches and a single lobe cam member attached to the engine camshaft. Mounted adjacent to said cam member are two proximity sensors which are mounted ninety degrees apart. Each sensor generates a binary valued electrical pulse which has a pulse width of 180°. Each pulse is supplied to a decoding means wherein the binary valued pulses are decoded and then to pulse generators for generating a predetermined controlled-time electrical pulse for each injector. All this initially takes place within ninety degrees of rotation of the camshaft after engine turn-on.

DETAILED DESCRIPTION

The quadrature trigger system for a sequential fuel injection system or for an ignition system of an internal combustion engine 10 according to the present invention is a binary quadrature system. The number of sequential events is equal to 2n where "n" is the number of switch assemblies required. In the preferred embodiment, the quadrature trigger system is for a four cylinder internal combustion engine and therefore "n" equals two.

Figure 1:
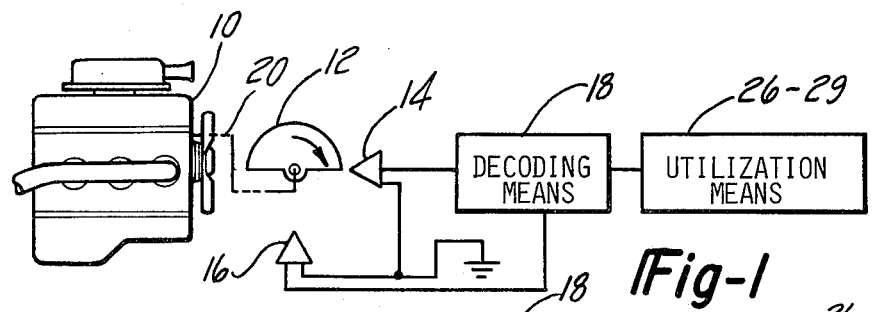
FIG. 1 is a system block diagram illustrating the sensor and its relationship to an internal combustion engine.

FIG. 1 is a schematic block diagram illustrating the relationship of the quadrature trigger system with an engine 10. The quadrature trigger system comprises a cam 12, two proximity sensors 14, 16 and a decoding means 18 for generating four pulses, one for each individual sequential event.

The cam 12 is a single lobe cam adapted for rotation with the camshaft 20 of the engine. The camshaft rotates once per each engine cycle. In a four cylinder engine, the single lobe has a rotational timing of one hundred eighty degrees and is therefore a semicircular cam.

The two proximity sensors 14, 16 may be hall-effect devices which are positioned ninety degrees apart and in sensing relationship to the periphery of the cam. Each sensor will generate a first binary valued signal when in a sensing relationship the cam and an opposite binary valued signal at all other times. In the embodiment of FIG. 1, each sensor will generate a binary one valued signal for one-half of an engine cycle and will overlap each other for one-quarter of an engine cycle.

In the alternative the proximity switches may be the equivalent of single pole double throw switches having an actuating arm in contact with the lobe on the cam or may be an optical device instead of the hall-effect device.

The decoding means 18 is an electronic circuit having two pulse generators 22, 24 each generating pulses for two sequential events or injectors 26, 27, 28, 29. Interconnecting the pulse generators 22, 24, the sensors 14, 16 and injectors 26–29 is a combination of logic elements for sorting and directing various control voltages for generating pulses for the injectors. In addition, the pulse generating means 30 includes acceleration enrichment means for generating acceleration pulses upon demand. The logic elements respond to the acceleration pulses and add the pulse time of these pulses to the injector pulses to thereby increase the amount of fuel injected into the engine. It is understood that as is well known, the time of the pulse width of the injector pulses is proportional to the amount of fuel injected into the engine.

Figure 2:
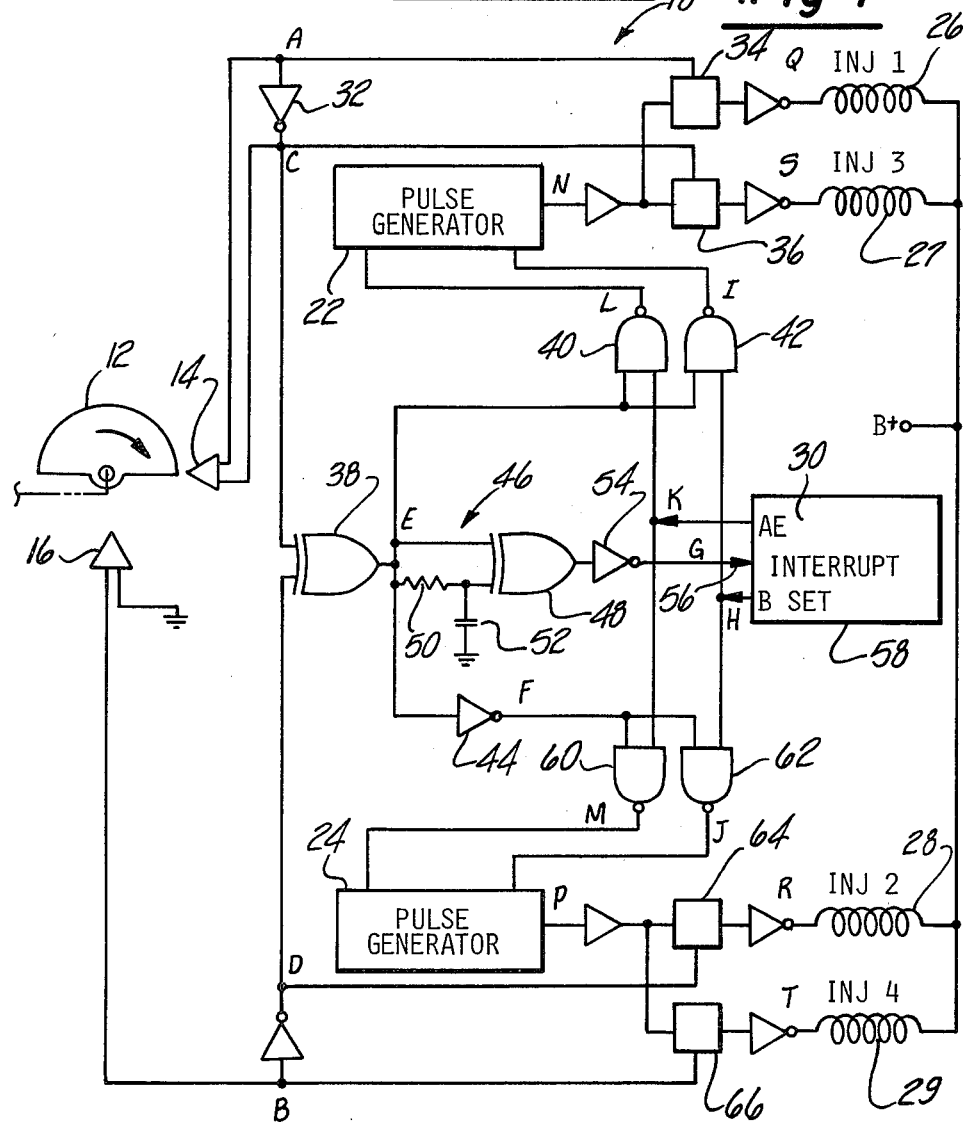
FIG. 2 is a schematic of one embodiment of the decoding circuitry in response to the sensor of FIG. 1.
Figure 3:
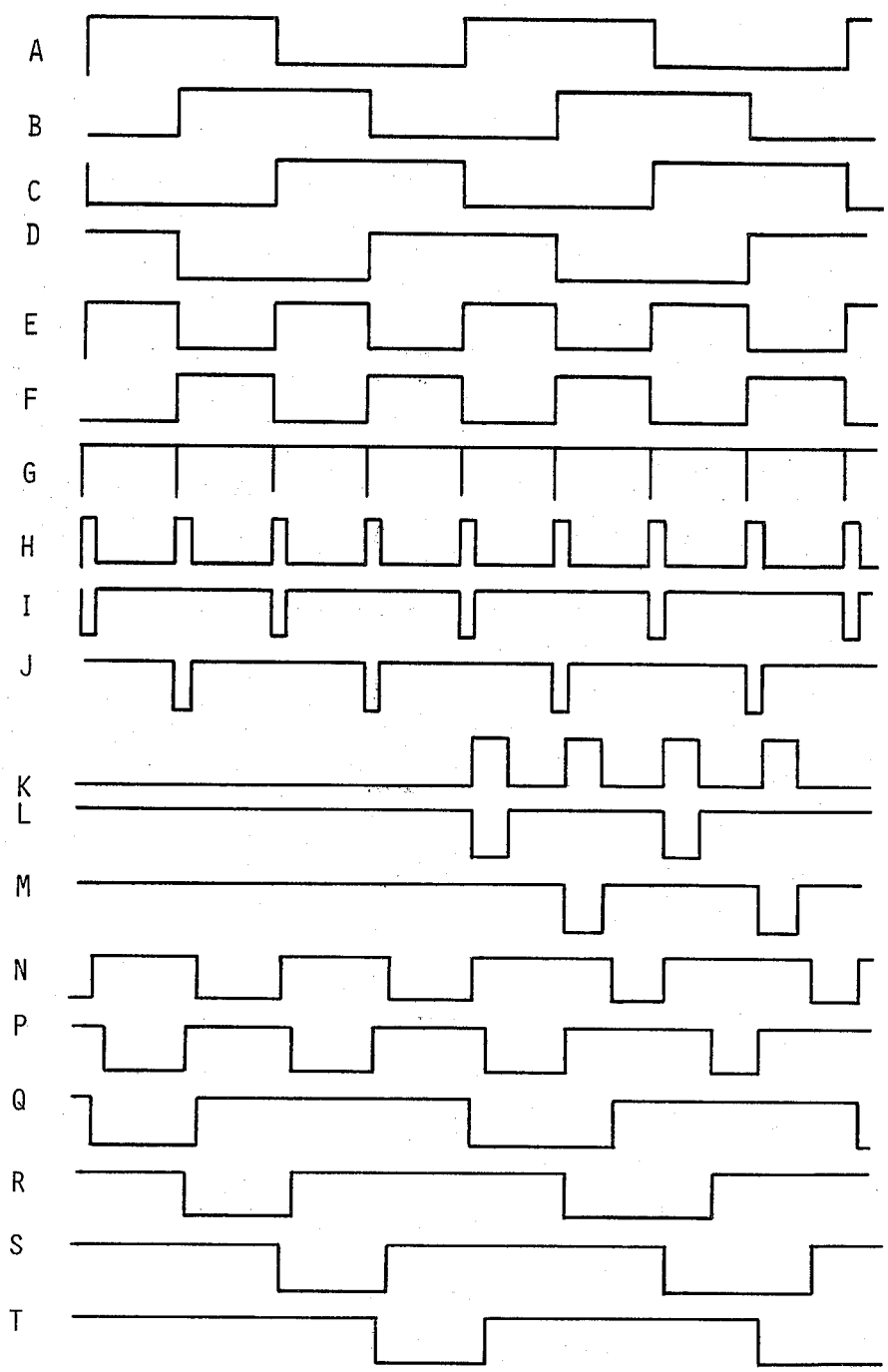
FIGS. 3A through 3T are voltage waveforms at various points in the schematic of FIG. 2.

Referring to FIGS. 2 and 3 together, the operation of the quadrature trigger system of the preferred embodiment is as follows. The problem solved in this embodiment is the proper generation of a particular fuel injector actuated pulse within one-quarter of an engine cycle upon engine turn on. This requires a decoding circuitry to initiate and multiplex the pulse and amplification stages to the proper injector.

The single lobe cam 12, as it rotates relative to the two proximity switches 14, 16 generates the pulses shown in FIGS. 3A and 3B. These pulses are illustrated as square waves and each have a duration equal to one-half an engine cycle and are out of phase with each other by one-quarter of a cycle. For the purposes of description, the actuation of injectors one 26 and three 27 will be illustrated.

The switch means 14 corresponding to injectors one and three generates the pulse illustrated in FIG. 3A. This pulse is supplied to the input of a digital inverter 32 and to the control gate of a first bilateral switch 34. The output of the digital inverter 32, FIG. 3C, is connected to the control gate of a second bilateral switch 36 and to one input of a two input exclusive OR gate 38. The second input to the exclusive OR gate 38 is the inverted pulse FIG. 3D from the switch means 16 corresponding to injectors two 28 and four 29. The output of the exclusive OR gate 38 is a square wave pulse FIG. 3E of twice the frequency of the pulse generated by either of the switch means 14, 16.

The output pulse of the exclusive OR gate 38 is supplied to one input of each of two NAND gates 40, 42 in the control circuit for injectors one and three, to the input of a first digital inverter 44 and to the input of a one-shot circuit 46. The one-shot circuit 46 in the preferred embodiment comprises a second two input exclusive OR gate 48 where one input receives the output of first exclusive OR 38 gate and the second input has a resistor 50 and a capacitor 52 electrically connected to the output of the first exclusive OR gate 38. The output of the second exclusive OR gate 48 is electrically connected to a second digital inverter 54 having its output signal, FIG. 3G, applied to the interrupt input 56 of a microprocessor 58 such as an Intel 8048. The output of the first digital inverter 44, FIG. 3F is connected to an input of each of two NAND gates 60, 62 in the control circuit for injectors two 28 and four 29.

The microprocessor 58 is programmed to receive inputs from several sensors, not shown, and to generate several control signals, one of which is called Beta Set as shown in FIG. 3H. This signal which occurs four times each engine cycle, indicates the start of an injector pulse as shown in FIGS. 3Q through 3T. The Beta Set signal is supplied to the second input of one of the two NAND gates 42, 62 in the control circuits for each injector group. The output signal of these NAND gates 42, 62 shown in FIG. 3I or 3J is supplied either one of two pulse generators 22, 24 to generate the properly timed pulse for the respective injectors. In the absence of an acceleration enrichment pulse, the output pulse of the pulse generators 22, 24, FIG. 3N or 3P, is shown in the first half of the Figs.

The pulse generator output pulse is amplified and in the case of injectors one and three, is supplied to the input of the first and second bilateral gates 34, 36. When either bilateral gate is enabled due to presence of the pulse illustrated in FIG. 3A or 3C, the pulse generator pulse is applied to actuate the appropriate injector coil. In the preferred embodiment, the logic levels are incorrect so the output of the bilateral switches 34, 36 is inverted to provide a ground level to the coil 26, 27 to be activated.

In a similar manner the pulse generator 24 generates a properly timed pulse to either of the bilateral switches 64, 66 and under control of signal generated by the second switch means 16 will cause actuation of either of the second or fourth injector 28, 29.

In certain situations, the microprocessor 58, through its several inputs calculates an acceleration enrichment operation for the engine 10 and generates an acceleration enrichment signal FIG. 3K. This signal is applied to the second input of the other of the two NAND gates 40, 60 in the control circuit for each injector group. The output signal of these NAND gates 40, 60 is respectively illustrated in FIGS. 3L and 3M. These signals, FIGS. 3L and 3M, are inputted to the two pulse generators 22, 24 and the respective output pulses therefrom are longer in time by the amount of time of the acceleration enrichment pulse width. This acceleration-enriched pulse generator output pulse is shown in the second half of FIGS. 3N and 3P.

Thus, it is seen that depending upon the binary value of the two proximity sensors, the decoding means will decode these signals and in response to proper control signals from a microprocessor, direct the correct injector actuated signal in the proper time sequence to correct injector. Synchronization of the output of the microprocessor to the proper injector requires only one transistion of the binary level signals from either of the proximity switches.

Having thus described an quadrature trigger system for sequential fuel injection, what is claimed is:

1. In an internal combustion engine having an engine camshaft rotating once for each engine cycle, a quadrature trigger system for a four cylinder sequential fuel injection system having an injector for each cylinder, the system for synchronizing the injections within the first ninety degrees of rotation of the camshaft said trigger system characterized by:

a semicircular cam member adapted for rotation with the camshaft;

two proximity sensors mounted relative to said cam member and positioned ninety degrees apart each responsive to said semicircular cam member for generating an electrical pulse having pulse width time equal to the time said semicircular cam member is in sensing proximity to each of said sensors;

decoding means having two pulse generators each generating sequential injector actuator pulses for two injectors; and logic means responsive to said sensors and said pulse generators for generating four sequential injector actuator pulses, each pulse logically directed to a particular one of the injectors.

2. In said trigger system of claim 1 additionally including acceleration enrichment means for generating acceleration pulses said acceleration pulses supplied to said logic means to be added to said sequential injector actuator pulses.

* * * * *